Sept. 18, 1962

H. WALTER 3,054,264

HYDRODYNAMIC-HYDROSTATIC TRANSMISSION

Filed Aug. 31, 1960

HELLMUTH WALTER
*INVENTOR.*

BY Daniel H. Bobis
*Atty*

Sept. 18, 1962  H. WALTER  3,054,264
HYDRODYNAMIC-HYDROSTATIC TRANSMISSION
Filed Aug. 31, 1960  4 Sheets-Sheet 2

HELLMUTH WALTER
INVENTOR.
BY Daniel H. Bobis
Atty

Sept. 18, 1962          H. WALTER          3,054,264

HYDRODYNAMIC-HYDROSTATIC TRANSMISSION

Filed Aug. 31, 1960          4 Sheets-Sheet 3

HELLMUTH WALTER
INVENTOR.

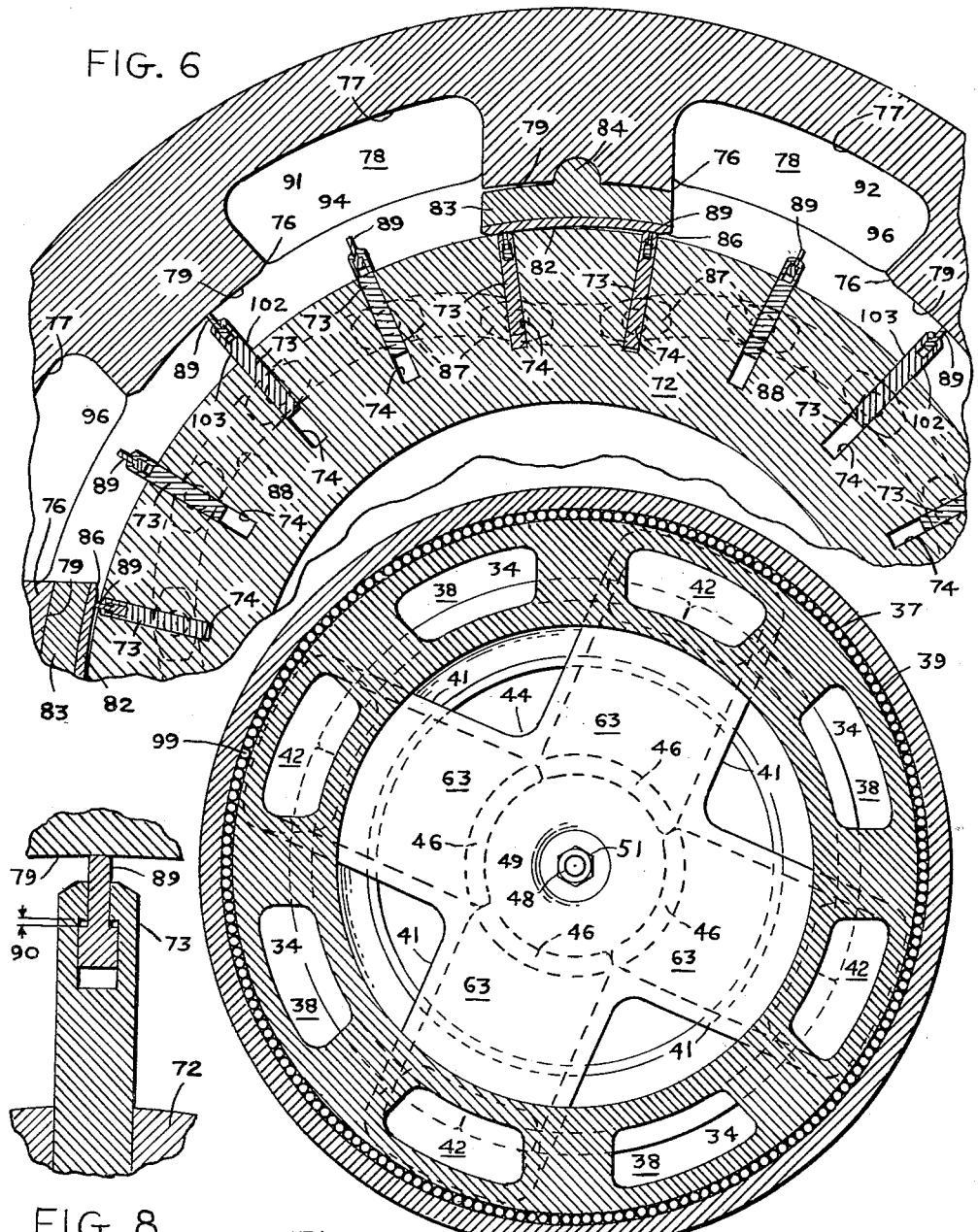

3,054,264
HYDRODYNAMIC-HYDROSTATIC TRANSMISSION
Hellmuth Walter, Upper Montclair, N.J., assignor to Worthington Corporation, Harrison, N.J., a corporation of Delaware
Filed Aug. 31, 1960, Ser. No. 53,094
14 Claims. (Cl. 60—53)

This invention relates to a hydraulic transmission device preferably for shipboard installations. More particularly this invention is a reversible silent hydraulic device by means of which improved transmission is obtained.

In shipboard installations efficient overall performance requires the operation of prime movers such as engines or turbines at high speeds, 3000 r.p.m. or more, so that a small prime mover of relatively light weight can be used. At the same time, however, it is desirable for effective propulsion and minimum noise to operate the propeller at a much slower speed, say 200 r.p.m. or less. The function here under particular scrutiny is to accomplish torque transmission from the prime mover to the propeller shaft. While ship propulsion is but one of the uses for the improved transmission of the present invention, it best serves to illustrate its numerous advantages and objects.

Space and noise limitations militate against the use of a gear speed reducing mechanism as a ship propeller drive.

By way of orientation to the terminology employed herein, a transmission includes a driving element operatively connected to a source of power and a driven element to adapt the power for more convenient utilization. Hydrodynamic driving elements employ means to impart predominantly velocity energy to fluids. Examples of hydrodynamic driving elements are screw pumps, axial flow propeller pumps, radial flow centrifugal pumps and hybrids of axial flow and radial flow pumps generally known as mixed flow pumps. Hydrostatic driven elements comprising any sort of positive displacement hydraulic machine such as piston or vane motors utilizing predominantly pressure fluid energy to produce mechanical work. To round out the permutations an example of a hydrostatic driving element would be a positive displacement pump and an example of a hydrodynamic driven element would be a water turbine.

Purely hydrodynamic transmissions with a pump as the driving element combined with a hydraulic turbine as the driven element have been used to transmit the propeller torque in question. Because of inherent inefficiencies of turbines which harness velocity energy, it generally requires several turbine stages to effectively utilize the energy of the fluid. Thus, for power transmission of the order of magnitude and with the efficiencies acceptable for shipboard installations an excessively large purely hydrodynamic transmission would be required which would transgress the prevailing stringent space limitation.

Various other proposed devices to accomplish this torque transmission have generally created more problems than they have solved.

The present invention provides a device especially suited to propeller torque transmission which avoids the above disadvantages. The foregoing is accomplished by a compact transmission teaming a hydrodynamic driving element with a hydrostatic driven element in a novel arrangement. More particularly, this invention includes a peculiar configuration of the centrifugal pump casing as a flow distributor or circular comprising means for defining a drive channel whereby energized fluid is transmitted from the driving element to the driven element and comprising means for defining a return channel whereby spent fluid is returned from the driven element to the driving element for recirculation.

The drive channel describes a flow channel just long enough to allow a continual increase of its cross area so that the energy of the fluid being transmitted to said driven element is partly converted from velocity energy to pressure energy to perform work in the hydrostatic driven element. The return channel is short and straight enough so that the pressure in the hydrodynamic driving element is maintained above a minimum level.

Hydrodynamic driving elements have the advantage over hydrostatic driving elements of convenient power input from rotating shafts and versatility resulting from speed variation and other well known control techniques. Hydrostatic driven elements have high power-output-to-power-input efficiencies because in the hydrostatic driven element the fluid in performing its work is confined so that its energy can be harnessed more effectively. It is desirable to team a hydrodynamic driving element and a hydrostatic driven element in one compact transmission; however, this combination requires means to convert velocity energy from the hydrodynamic element into pressure energy for the operation of the positive displacement hydrostatic driven element. The present invention accomplishes this energy conversion with a minimum of space expenditure by means of a novel mechanism comprising a hydrodynamic driving element for energizing fluid therein operatively associated with a source of power. A casing for the hydrodynamic driving element which has a plurality of drive channel means and a plurality of return channel means. The drive channel means and the return channel means are of equal numbers and alternately arranged in said casing. A hydrostatic driven element operatively associated with a driven shaft and adapted to be rotated by the energized fluid from the hydrodynamic driving element. A casing for said hydrostatic driven element which has a plurality of chamber means formed therein and is connected to the casing of the hydrodynamic driving element. The casing for the hydrostatic driven element has a plurality of chamber means formed therein and is connected to the casing of the hydrodynamic driving element. There are port means formed in pairs at the end of the chamber means adjacent to the hydrodynamic driving element. These pairs of port means connect alternately to the drive channel means and the return channel means.

By currently used hydraulic transmission devices propeller reversal means, which are necessary for ship maneuvering, also require space. By the installation of the flow circulator of the present invention, with its drive channel and its return channel movably disposed relative the driven element, the reversal of flow through the driven element can be affected by movement of the flow circulator. Accordingly this novel flow circulator facilitates the reversal of propeller rotation and obviates the need of a separate reversal fluid circuit.

The present invention also offers acceleration advantages. Rapidity in bringing the propeller up to rated speed and in reversing the propeller are important features in the performance of a propelled ship. The novel flow distributor of the present invention can accommodate a large number of pairs of motor chambers for vane motor operation. Accordingly, the total vane area against which the fluid presses for vane rotation is increased. This increase in vane area not only permits higher torque conversion but also substantially decreases the time in which the propeller is brought to rated speed or is reversed.

Because of sonar and for other obvious reasons quiet operation ranks high among criteria for the acceptance of machinery in naval vessels. Even though flow in hydraulic machinery is turbulent, smoothness of flow minimizes extraneous fluid motion which is a cause of noise.

The channels formed in the flow circulator of the present invention facilitate the streamlining of fluid flow to and from the hydrostatic driven element thereby contributing to the silence of operation.

Local boiling under reduced pressure is a cause of vibration, including noise, as well as a cause of cavitation in hydrodynamic machinery. The central location of the pump fluid receiving means in close proximity with the chambers of the hydrostatic driven element shortens and straightens the return channel thus increasing the pressure of fluid returning to the pump and accordingly reducing the tendency for cavitation to occur.

A further advantage of this invention is that it permits the installation of the driven shaft of the hydrostatic driven element eccentrically and even inclined to the driving shaft which operates the hydrodynamic driving element.

A further object of the present invention is that the flow circulator can be integrally formed with the housing of the hydrodynamic driving element and can be rotatably mounted if the torque converter is to be reversible.

A further object of the present invention is to permit the rotary machining of the interior surfaces of projections from the interior of the vane motor housing in one machining step.

A further object of the present invention is to support the rotor of a vane motor by means of the same pads used to team circumferentially spaced chambers into pairs.

A further object of the present invention is to employ tiltable mounting of pads used to team circumferentially spaced chambers into pairs.

A further object of the present invention is that the tiltable bearing pads of the vane motor are tilted by means of high pressure in the fluid inlet chambers so that a slot between the pad and the rotor opens against the direction of rotation permitting lubricant to be pulled into the slot to act as a sealing means preventing leakage flow from high pressure chambers to adjacent low pressure chambers.

Other advantages and a fuller understanding of this improved hydraulic transmission will be obtained when it is considered in connection with the accompanying specification and drawings in which:

FIGURE 6 is an enlarged cross-section through the vane motor housing a tiltable pad, vanes and the rotor, showing the relationship of the chambers and the vanes of the driven motor.

FIGURE 7 is a cross-section taken on line 7—7 of FIGURE 1 showing the orientation of the drive ports and return channels as well as the general shape of the return channels.

FIGURE 8 is an enlarged cross-section of a vane tip.

Figure 1:
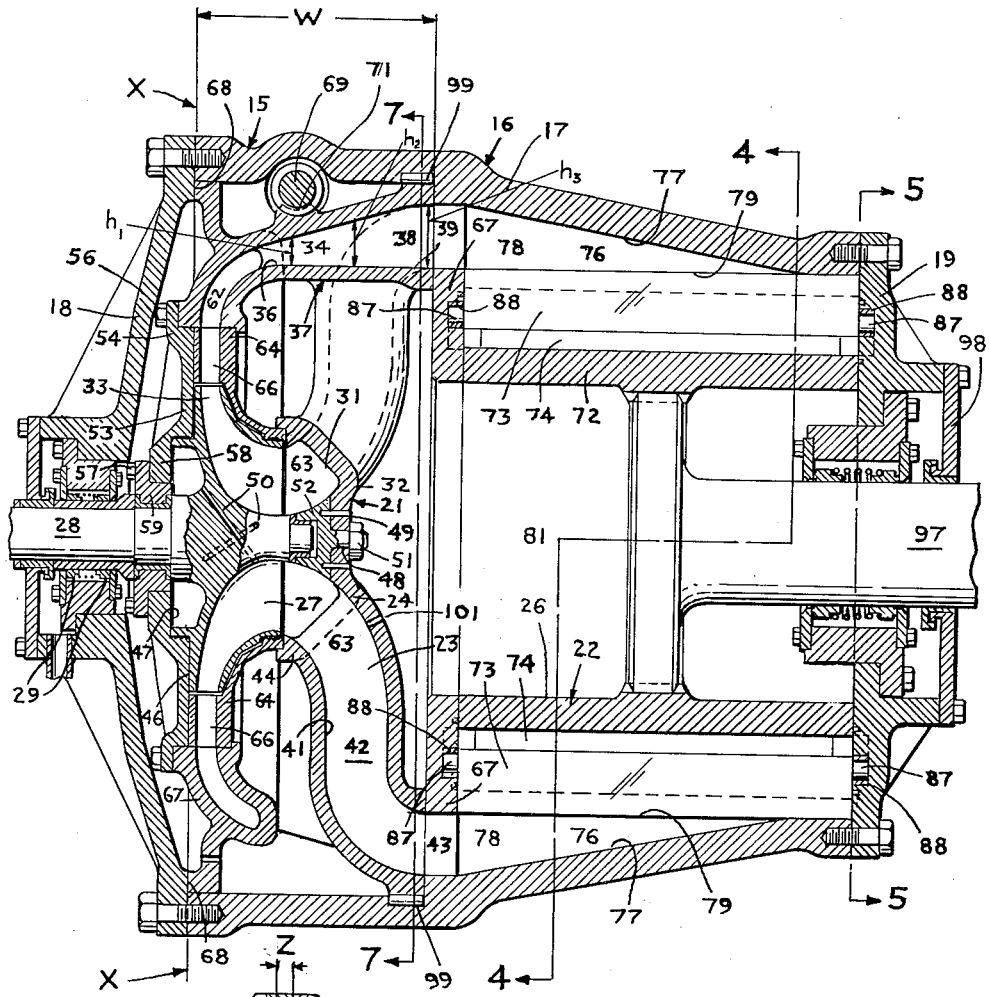
FIGURE 1 is a longitudinal vertical section of the invention taken along line 1—1 of FIGURE 4 showing the general orientation of the hydrodynamic driving element and the hydrostatic driven element of this invention.

Referring to FIGURE 1, a form of the improved hydraulic transmission generally designated 15 is shown to be a single compact unit contained in a three-piece fluid-tight housing generally designated 16. Housing 16 comprises medial housing section or hydrastatic casing element 17, driving end cover 18 and driven end cover 19. Other housing arrangements are adaptable to this invention without affecting its teaching but for clarity of presentation the housing arrangement of FIGURE 1 avoids having seals and extraneous details confuse the novel structure.

Situated side by side within housing 16 are respectively hydrodynamic driving element generally designated 21 and hydrostatic driven element generally designated 22 hydraulically coupled by means of a circulating system generally designated 23. Hydrodynamic driving element 21 can be any form of pump which imparts predominantly velocity energy to fluids and is shown as centrifugal pump 24. Hydrostatic driven element 22 can be any form of positive displacement hydraulic motor and is shown as vane motor 26. Housing 16 plays a role in the operation of vane motor 26 and to that extent it is a part of the invention. As far as centrifugal pump 24 is concerned, housing 16 merely serves in providing structural unification and sealing which are both well known and form no part of the present invention.

In the preferred embodiment of the invention shown in the drawings, a fluid energizing means shown as impeller 27 of centrifugal pump 24 is mounted on driving shaft 28 which penetrates into housing 16. A source of power such as a turbine or an engine (not here shown) is connected to driving shaft 28 to impart power thereto. As shown in FIGURE 1, when the transmission 15 is assembled, driving shaft 28 passes through driving end cover 18 of housing 16 via an oil-tight seal generally designated 29. Impeller 27 energizes and moves fluid from a fluid receiving means shown as an inflow opening 31 at the end 32 of centrifugal pump 24 adjacent vane motor 26. Impeller 27 drives the fluid out of fluid discharging means shown as the peripheral outlet 33 of centrifugal pump 24 which peripheral outlet 33 communicates with drive channels 34 formed by drive channel defining means comprising wall 36 of the novel flow circulator generally designated 37.

Figure 2:
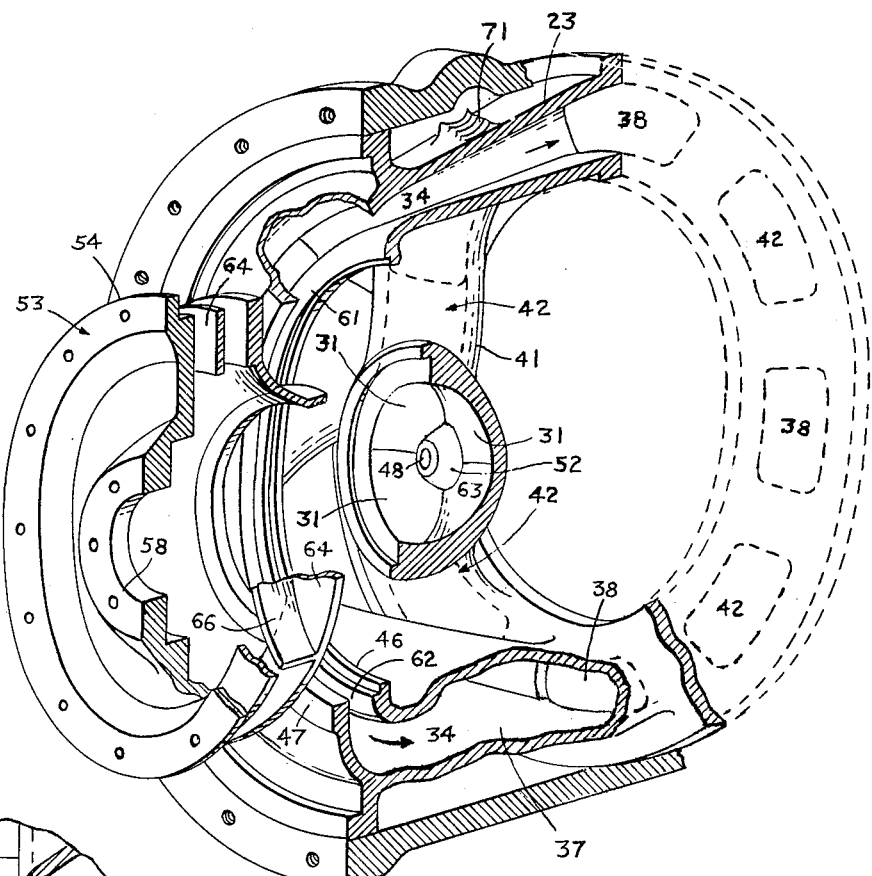
FIGURE 2 is an exploded perspective partly fragmented view of the flow circulator showing the parts in spaced relationship to each other.
Figure 3:
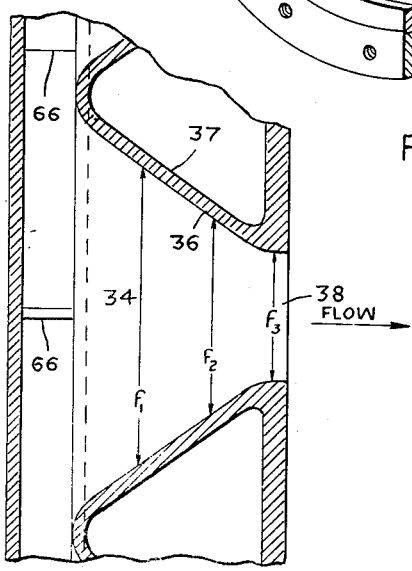
FIGURE 3 is a detailed view showing the shape of the developed drive channels of the flow circulator.

Flow circulator 37 is shown in its operative relationship with associated parts in FIGURE 1. In FIGURE 2 flow circulator 37 is shown in spaced relationship from its associated parts. FIGURE 3 illustrates the flared inlet of drive channels 34. Drive channels 34 terminate in drive channel ports 38 defined in selector member 39 which is integrally connected to flow circulator 37. Means comprising interior walls 41 define return channels 42 in flow circulator 37. Return channels 42, which communicate inflow opening 31 and return channel ports 43 formed in selector member 39, are best seen in FIGURES 1 and 7. The alternating circumferential spacing of drive channels 34 and return channels 42 can be seen from FIGURES 2 and 7.

As is most clearly shown in FIGURES 1 and 2 flow circulator 37 is smoothly developed with pump casing or hydrodynamic casing element 44 to provide smoothness of flow, to obviate sealing problems and to provide support for pump casing 44. While a combined pump casing 44 and flow circulator 37 is shown as the preferred embodiment, the separation of these parts would not depart from the teaching of this invention. The pump casing 44 has a central impeller receiving opening 46 on the side 47 of the pump 24 remote from vane motor 26 to receive pump impeller 27. As seen in FIGURES 1 and 7 a hole 48 is provided in the end 49 of the pump casing 44 adjacent the vane motor 26 to receive screw 51 which engages bearing 52 for the journaling of driving shaft 28. Upon the insertion of impeller 27 central impeller receiving opening 46 is closed by casing complement plate 53 secured at its periphery 54 by bolts 56 to flow circulator 37 and connected by bolts 57 near its inside diameter 58 to shaft bearing member 59. Well known means including pressure balancing conduits 50 are included to minimize axial thrust on pump impeller 27.

Flow circulator 37 may be cast or otherwise suitably fabricated to have an equal number of drive channels 34 and return channels 42. It will be seen that movement of the flow circulator 37 is required for reversal of the sense of rotation of transmission 15. If flow circulator 37 were formed separately from pump casing 44, the reversal movement could be imparted by a displacement of the flow circulator 37 relative pump casing 44. Four drive channels 34 and four return channels 42 are here shown, but all that is necessary for the teaching of this invention is that the number of drive channels 34 and the number of return channels 42 be equal. The channels are circumferentially spaced with drive channels 34 and return channels 42 in alternate relationship to each other. When properly assembled as shown in FIGURE 1 the portion 62 of the flow circulator in which drive channels 34 originate is located in radial alignment with the peripheral outlet 33 of the pump and the portion 63 of the flow circulator in which the return channels 42 terminate is located in axial alignment with inflow opening 31 of pump 24. Drive channels 34 are just long enough to allow a continual increase in its width so that the energy of the fluid from pump 24 will be partially converted from velocity energy to pressure energy thereby adapting the fluid for use in a hydrostatic driven element 22 which relies upon pressure energy. Although the width $f1$, $f2$ and $f3$ of drive channels 34 decreases as shown in FIGURE 3, the sectional area does not decrease as the corresponding heights $H_1$, $H_2$, $H_3$ of drive channel 34 increase in section to at least compensate therefor as clearly shown in FIGURE 1. Return channels 42 describe short and straight flow paths so that the inflow pressure of hydrodynamic driving element 21 will be maintained above a predetermined level thereby avoiding cavitation.

The installation of other diffuser means in operative relationship with drive channels 34 increase the conversion of the fluid energy from velocity energy to pressure energy. Either a vaned or a vaneless type of diffuser may be effectively used depending upon design conditions. Diffuser 64 shown in FIGURE 2 contains an annular arrangement of vanes 66. Depending on the design conditions diffuser 64 can be omitted if drive channels 34 allow sufficient diffusion.

In the housing arrangement shown in FIGURE 1, selector member 39 integrally formed on flow circulator 37 is held against annular head plate 67 of medial housing section 17. Flow circulator 37 is held against axial movement by abutment between head plate 67 and surface 68 on driving end cover 18. This fit, however, does not restrict the limited rotation of flow circulator 37 by hand or mechanical operation of worm gear 69 meshing with teeth 71 provided on flow circulator 37. Obviously the movement of the flow circulator 37 in the shown embodiment provides rotational disposition of selector member 39 and head plate 67 relative each other. A far less desirable movable disposition could comprise movement of the flow circulator 37 toward and away from vane motor 26 with a corresponding longitudinal disposition of ports for flow direction setting.

For any particular installation by specially forming flow circulator 37 an axial offset or even a skewness of the vane motor 26 from the driving shaft 28 may be accommodated.

Figure 4:
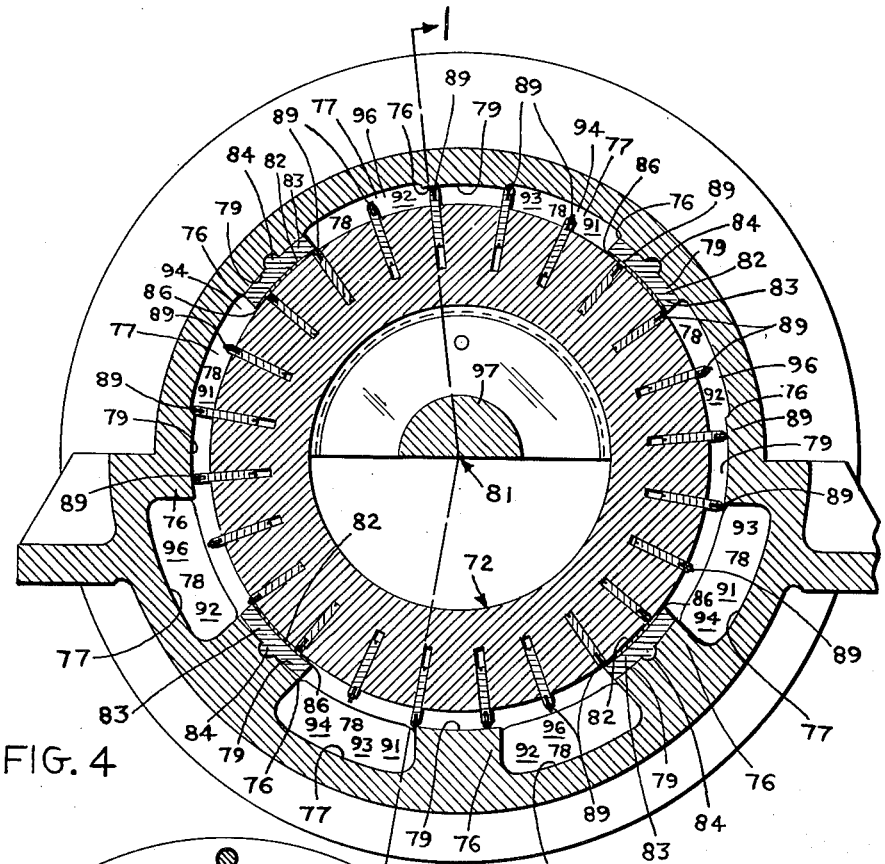
FIGURE 4 is a cross-section of the vane motor taken on line 4—4 of FIGURE 1.

As shown in FIGURES 4 and 6 the rotor 72 of vane motor 26 has reciprocable radially movable vanes 73 disposed in slots 74 formed therein. Medial housing section 17 has partition means shown as ridges 76 projecting from the interior surface 77 and extending the axial length of the vane motor to define chambers 78 circumferentially spaced about rotor 72. Forming the interior surface 79 ridges 76 equal radial distances from the axis 81 of the medial housing section 17 permit these surfaces 79 to be machined in a single rotary operation. Pads 82 are mounted on alternate ridges 83 to group chambers 78 into an operative unit. Pads 82 prevent communication of fluid except between paired chambers and pads 82 also support rotor 72. In operation each pad 82 tilts slightly about its supporting hinge 84 and this provides a slight clearance space 86 into which the fluid being pumped will flow to lubricate bearing surfaces. As seen in FIGURE 1, vanes 73 are provided with end sliding shoes 87 which fit into cam grooves 88 shown in FIGURE 5 thus causing vanes 73 to reciprocate radially within slots 74 to clear pads 82. Vane tip projections 89 shown in FIGURE 8 extend beyond the vanes 73 in response to centrifugal force for sealing. Vane tips 89 can be worn down for the length 90 before leakage can occur between the ends of tips 89 and the sliding surface of the pads 82. Fluid pumped into one of a pair of chambers will rotate a vane 73 of vane motor 26 and in so doing the fluid will communicate with the paired chamber so that it may be exhausted therefrom. For convenience of description each pair of chambers will be considered as consisting of a first chamber 91 and a second chamber 92 so that no first chambers 91 are adjacent each other. All of the chambers are closed at one end by the driven end cover 19 and at the end adjacent to hydrodynamic driving element 21 they communicate with ports 93 in head plate 67 of vane motor 26—first chambers 91 by means of first chamber ports 94 and second chambers 92 by means of second chamber ports 96.

As shown in FIGURE 1 driven power take-off shaft 97 is connected to turn with rotor 72 of vane motor 26 and penetrates out of housing 16 through an oil tight seal generally designated 98 which seal is disposed in driven end cover 19.

Various numbers of pairs of chambers 78 may be employed for vane motor 26 and the total vane area against which the fluid presses to turn rotor 72 is increased according to the number of the pairs of chambers 78. Thus, the provision of more pairs of chambers 78 permits higher torque conversion than had heretofore been possible to attain and also substantially decreases the time in which driven power take-off shaft 97 is brought to rated speed.

Energized fluid is transmitted from hydrodynamic driving element 21 to hydrostatic driven element 22 via drive channels 34 of flow circulator 37. Return channels 42 are formed in the flow circulator 37 to return spent fluid from hydrostatic driven element 22 to the hydrodynamic driving element 21. As seen in FIGURES 1, 2 and 7, drive channels 34 and return channels 42 communicate with drive channel ports 38 and return channel ports 43 circumferentially spaced about disc-shaped selector member 39. This circumferentially alternating arrangement is matched by the alternating arrangement of first chamber ports 94 and second chamber ports 96 in head plate 67 (FIGURE 1) of vane motor 26. The movement of selector member 39 and head plate 67 relative each other provides a forward setting and a reverse setting which select the sense of rotation of rotor 72. When selector member 39 is in its forward setting relative head plate 67 all of the drive channel ports 38 communicate with all of the first chamber ports 94 to supply energized fluid for turning rotor 72 in the forward sense and all of the second chamber ports 96 communicate with all of the return channel ports 43 to return spent fluid to inflow opening 31 of centrifugal pump 24. When selector member 39 is in its reverse setting relative head plate 67 all of the drive channel ports 38 communicate with all of the second chamber ports 96 to supply energized fluid for turning rotor 72 in the reverse sense and all of the first chamber ports 94 communicate with all of the return channel ports 43 to return spent fluid to inflow opening 31 of centrifugal pump 24.

While all that is necessary to accomplish a reversal of the improved hydraulic transmission 15 according to the present invention is a movable disposition of selector member 39 of the flow circular 37 and head plate 67 of vane motor 26 relative one another, a rotational movable disposition is believed to be most convenient and means to impart this rotational disposition are shown in FIGURES 1 and 2. In FIGURE 1 it is seen that flow circulator 37 is rotatable on roller bearings 99 by means of worm gear 69 which engages threads 71 shown on flow circulator 37 in FIGURE 2.

As is well known in the art removal of gases entrained in the fluid and return of cooled and degasified fluid at the fluid receiving means of a pump can be employed to reduce the danger of local boiling. Locating the return tap of the cooling circuit (not shown) at inflow opening 31 of centrifugal pump 24 provides a supplemental supply of fluid for delivery to pump 24 in the event of pressure fall-off. Thus another safeguard against local boiling is incorporated.

Balancing tap 101 communicates both sides of the end 32 of centrifugal pump 24. By locating balancing tap 101 at the inflow opening 31 a further supply of fluid is made available in the event of inlet pressure fall-off in pump 24.

The outlet tap for the cooling circuit (not shown) would be located at a suitable radial distance from the axis of the pump. An auxiliary pump (not shown) may be included to compensate for leakage and to further insure the maintenance of a minimum level of pressure in the pump 24.

Figure 9:
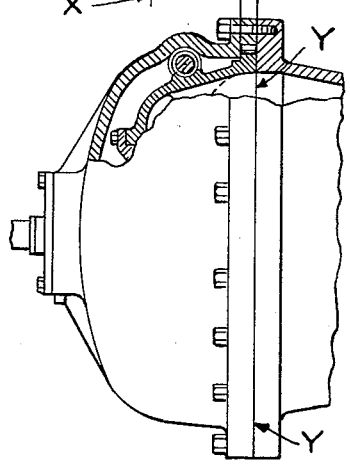
FIGURE 9 is a modified assembly of the invention especially suited to compact installations.

A modified form of the invention is shown in FIGURE 9. In the modified form dividing plane x—x between end cover 18 and medial housing section 17 can be transposed to the location y—y which is in the contact plane between selector member 39 of the casing of the centrifugal pump and head plate 67. In the modified form surface 68 is located at the left end of rollers 99. The abutment between head plate 67 and surface 68 is wider than the length of rollers 99 only for the necessary clearance. This modified form of the invention permits the driving and the driven elements to be assembled separately from one another. Because dividing plane y—y does not cut through any parts, vertical insertion of either half of the transmission is possible; accordingly, less installation space is required. Employing the modified form of the invention abutment distance Z is obviously shorter than abutment distance W; thus, thermal expansion has less effect on the clearance between selector member 39 and head plate 67.

Operation

The hydraulic transmission of the invention utilizes a fluid, such as a thin oil, to transmit power from hydrodynamic driving element 21 to hydrostatic driven element 22. The interior of circulating system 23 is completely filled with fluid and upon driving of the pump impeller 27, the fluid is energized and circulated into drive channels 34 of flow circulator 37 passing in the interim through diffuser 64 so that the cumulative effect is a substantial conversion of the energy of the fluid from velocity energy to pressure energy. The fluid flow is conducted to drive channel ports 38 in selector member 39.

Figure 5:
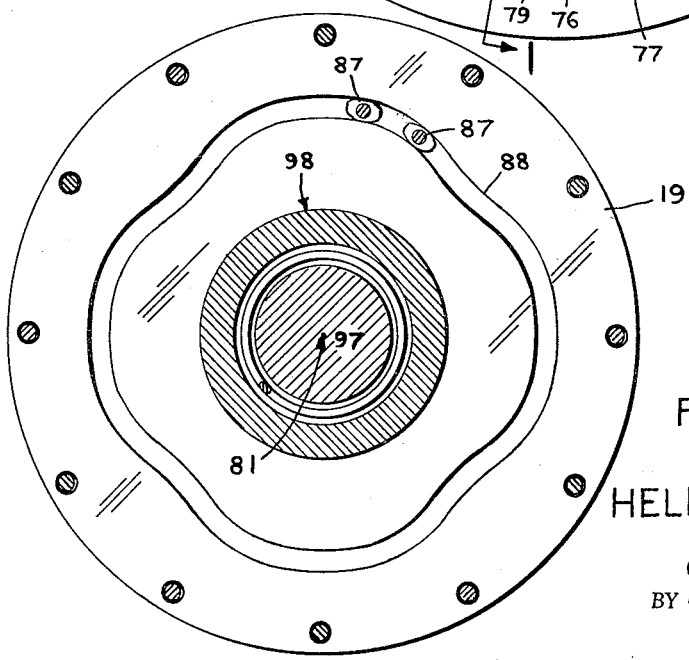
FIGURE 5 is a cross-section taken on line 5—5 of FIGURE 1 showing the track for reciprocating the vanes relative the axis of the rotor to clear the long projections.

With selector member 39 in its forward setting the fluid from drive channel ports 38 passes through first chamber ports 94 in head plate 67 of vane motor 26. The energized fluid enters into four first chambers 91 shown in FIGURE 4 which are circumferentially spaced about rotor 72. The fluid transmitted to each of the first chambers 91 then presses against the vane surface 102 on the vanes specifically designated in FIGURE 6. The vane, by virtue of vane end shoes 87 in cam grooves 88 illustrated in FIGURE 5, is in its most radially outward reciprocated position and thus causes rotation of rotor 72 and its associated driven power take-off shaft in a forward sense. After forcing a rotation of rotor 72 through an arc smaller than the width of the ridge 76 and forcing a corresponding rotation of driven power take-off shaft 97, the fluid enters the four circumferentially spaced second chambers 92 shown in FIGURE 4. From second chambers 92 the fluid passes through second chamber ports 96 in head plate 67 through return channel ports 43 aligned therewith and is returned through return channels 42 of flow circular 37 to inflow opening 31 of the pump for reenergizing and recirculating by pump impeller 27.

To reverse the sense of rotation of rotor 72 of vane motor 26, it is necessary only to rotate selector member 39 through a predetermined arc or portion of a revolution so that the drive channel ports 38 communicate with second chamber ports 96 and first chamber ports 94 communicate with return channel ports 43 in which instance the fluid energized by pump impeller 27 will enter second chambers 92 and press against surfaces 103 of the vanes (see FIG. 6) to cause rotation of rotor 72 in the reverse sense. In the embodiment of the invention herein described flow circulator 37 is rotated by hand or by the mechanical operation of worm gear 69, and since four first chambers 91 and four second chambers 92 are provided for vane motor 26, flow circulator 37 to affect reversal of sense of rotation of vane motor 26 is rotated one-eighth revolution or through an arc of 45 degrees.

It will be understood that the invention is not to be limited to the specific construction or arrangement of parts shown, but that they may be widely modified within the invention defined by the claims.

What is claimed is:

1. A mechanism for hydraulic transmission comprising a centrifugal pump for energizing fluid therein and connected to a source of power, a casing for said pump having a plurality of drive channel means and a plurality of return channel means formed therein in equal numbers and alternately arranged in said casing, a motor having a rotor connected to a driven shaft and connected to be rotated by the energized fluid from said centrifugal pump, a plurality of vanes slidably disposed in said rotor, a casing for said motor having a plurality of chamber means formed therein and connected to said casing of said pump, port means formed in said chamber means adjacent said pump and connected alternately with said drive channel means and said return channel means, said casing of said motor having ridges formed on the interior thereof, said ridges projecting inwardly in the direction of said rotor and alternately forming circumferentially spaced chamber means therebetween, the interior surfaces of said ridges formed equidistant from the axis of said rotor to simplify the machining of said ridges, said ridges disposed in said chamber means to separate said port means in said chamber means, pad means mounted on the interior surface of said alternate ridges bounding said chamber means, said pad means tiltably mounted to be rocked in response to a difference in pressure between adjacent chamber means thereby opening transverse slots so as to form spaces between said pad means and said ridges and between said pad means and said rotor, and fluid drawn into the slots between said pad means and said rotor to lubricate and to seal the spaces therebetween whereby leakage flow in the opposite direction is prevented.

2. A mechanism for hydraulic transmission comprising a centrifugal pump for energizing fluid therein and connected to a source of power, a casing for said pump having a plurality of drive channel means and a plurality of return channel means formed therein in equal numbers and alternately arranged in said casing, a motor having a rotor connected to a driven shaft and connected to be rotated by the energized fluid from said centrifugal pump, a plurality of vanes slidably disposed in said rotor, a casing for said motor having a plurality of chamber means formed therein and connected to said casing of said pump, port means formed in said chamber means adjacent said pump and connected alternately with said drive channel means and said return channel means, pad means to separate and to seal said adjacent chamber means, each of said vanes having slot means forming a longitudinal tip recess therein, shoulders formed by said slot means, protracting tips mounted in each of said longitudinal tip recesses, stops formed on said protracting tips, said protracting tips protractable by centrifugal force, said protracting tips having an excess of length to provide for wear, said protraction tips restrained from being ejected out of said recesses by abutting engagement of said shoulders and said stops.

3. A mechanism for hydrodynamic-hydrostatic transmission comprising:
 (a) a casing having a hydrodynamic side at one end and a hydrostatic side at the other end thereof,
 (b) said casing having a plurality of drive channel means and a plurality of return channel means formed therein to communicate fluid between the hydrodynamic side and the hydrostatic side in a continuous cycle,
 (c) said drive channel means and said return channel means being of equal number and being circumferentially spaced in said casing in alternately arranged relationship to each other,
 (d) a hydrodynamic driving element for energizing fluid rotatably disposed in the hydrodynamic side of said casing and adapted to communicate fluid from said return channel means to said drive channel means,
 (e) said hydrodynamic driving element being connected to a source of power,
 (f) a hydrostatic driven element rotatably disposed in the hydrostatic side of said casing and connected to a driven shaft,
 (g) a plurality of chamber means formed in the hydrostatic side of said casing about said hydrostatic driven element,
 (h) means communicating said return channel means and said driven channel means with said chamber means whereby energized fluid is introduced into the hydrostatic side of said casing from said drive channel means to drive said hydrostatic driven element and subsequently discharged into said return channel means to be returned to the hydrodynamic side of said casing where the fluid is re-energized said hydrodynamic element.

4. The combination claimed in claim 3 wherein
 (a) said casing has a casing element for the hydrodynamic side and a casing element for the hydrostatic side thereof,
 (b) said casing elements being connected to form said mechanism casing.

5. The combination claimed in claim 4 wherein said hydrodynamic driving element comprises a centrifugal pump having an impeller mounted on a shaft, said shaft being connected to a source of power, and said hydrostatic driven element comprises a multi-acting slide vane motor in operative asociation with a driven shaft.

6. The combination claimed in claim 5 wherein the ends of said drive channel means and said return channel means on the hydrostatic side of said casing are formed in said casing of said pump in a plane substantially perpendicular to the axis of said motor, port means being formed in each of said chamber means at the ends thereof adjacent said drive channel means and said return channel means in a plane substantially perpendicular to the axis of said motor and alternately connected to said driving channel means and said return channel means.

7. The combination claimed in claim 6 wherein said mechanism has a housing, said housing including said casing for said pump and said casing for said motor, means to connect said casing for said pump and said casing for said motor, and said means adapted to be disconnected whereby said pump and said motor will be completely independent from each other.

8. The combination claimed in claim 6 wherein means for rotating said pump casing are mounted thereon, said rotation means being adapted to rotate said pump casing about the axis of said pump to reverse the order of the connection of said drive channel means and return channel means to said port means in said chamber means of said motor thereby reversing the direction of rotation of said motor.

9. The combination claimed in claim 8 wherein said drive channel means have diffuser vanes mounted therein to direct the flow of the energized fluid.

10. A mechanism for hydrodynamic-hydrostatic transmission comprising:
 (a) a casing having a hydrodynamic casing element and a hydrostatic casing element therein,
 (b) said hydrodynamic casing element and said hydrostatic casing element operatively connected to each other,
 (c) a centrifugal pump having an impeller disposed in said hydrodynamic casing element for energizing the fluid therein,
 (d) said impeller operatively associated with a source of power,
 (e) a plurality of return channel means formed in said hydrodynamic casing element for communicating fluid from said hydrostatic casing element,
 (f) a plurality of drive channel means formed in said hydrodynamic casing element in equal numbers to said return channel means and in alternate arrangement therewith,
 (g) a motor having a rotor means disposed in said hydrostatic casing element,
 (h) said rotor means connected to a driven shaft,
 (i) a plurality of vanes slidably disposed in said rotor means,
 (j) a plurality of chamber means formed in said hydrostatic casing element about said rotor means,
 (k) port means formed in said chamber means adjacent each of said return channel means and said drive channel means whereby fluid is free to pass therethrough,
 (l) ridges formed projecting inwardly in said hydrostatic casing element with the interior surfaces thereof equidistantly spaced from the axis of said rotor means,
 (m) pad means mounted on the interior surface of alternate ridges to form said chamber means therebetween,
 (n) said pad means supporting said rotor means,
 (o) each ridge disposed between said pad mounting ridges to extend into said chamber means to separate said port means in said chamber means whereby energized fluid is introduced from said drive channel means into said chamber means to drive said rotor means and subsequently returned to said hydrodynamic casing element in said return channel means.

11. The combination claimed in claim 10 wherein
 (a) said pad means tiltably mounted to be rocked in response to a difference in pressure in adjacent chamber means,
 (b) a first slot formed on the higher pressure side of pad means between said pad means and said ridge to tilt said pad means whereby said adjacent chamber means are sealed from each other,
 (c) a second slot formed on the lower pressure side of said pad means between said pad means and said rotor means to lubricate the bearing engagement of said pad means and said rotor means.

12. The combination claimed in claim 10 wherein
 (a) a housing has said hydrodynamic casing element and said hydrostatic casing element disposed therein,
 (b) means disposed in said housing between said housing and said hydrodynamic casing element,
 (c) said means adapted to rotate said hydrodynamic casing element about the axis of said rotor means to reverse the order of the disposition of said port means to said return channel means and said drive channel means thereby reversing the direction of said motor.

13. The combination claimed in claim 12 wherein said port means are circumferentially spaced and alternately connected to each of said return channel means and each of said drive channel means.

14. The combination claimed in claim 13 wherein said casing of said motor has ridges formed on the interior thereof, said ridges project inwardly in the direction of said rotor and alternately formed circumferentially spaced chamber means of substantially equal volumes therebetween, the interior surface of said ridges formed equidistant from the axis of said rotor to simplify the machining of said ridges, said ridges disposed in said chamber means to separate said port means in said chamber means and to divide said chamber means into two equal chambered portions.

References Cited in the file of this patent

UNITED STATES PATENTS

| | | |
|---|---|---|
| 2,422,091 | Hunter | June 24, 1947 |
| 2,870,747 | Gurries | Jan. 27, 1959 |
| 2,927,430 | Castles | Mar. 8, 1960 |

FOREIGN PATENTS

| | | |
|---|---|---|
| 184,455 | Great Britain | Oct. 18, 1923 |
| 444,317 | Germany | May 19, 1927 |
| 681,546 | Great Britain | Oct. 29, 1952 |